United States Patent
Capodieci et al.

(10) Patent No.: US 7,305,645 B1
(45) Date of Patent: Dec. 4, 2007

(54) METHOD FOR MANUFACTURING PLACE & ROUTE BASED ON 2-D FORBIDDEN PATTERNS

(75) Inventors: Luigi Capodieci, Santa Cruz, CA (US); Bhanwar Singh, Morgan Hill, CA (US); Ramkumar Subramanian, Sunnyvale, CA (US)

(73) Assignee: Advanced Micro Technologies, Inc., Sunnyvale, CA (US)

(*) Notice: Subject to any disclaimer, the term of this patent is extended or adjusted under 35 U.S.C. 154(b) by 206 days.

(21) Appl. No.: 10/935,488

(22) Filed: Sep. 7, 2004

(51) Int. Cl.
  *G06F 17/50* (2006.01)
  *G06K 9/00* (2006.01)

(52) U.S. Cl. .............. 716/12; 716/8; 382/145

(58) Field of Classification Search .............. 716/8–14; 382/144–145
  See application file for complete search history.

(56) References Cited

U.S. PATENT DOCUMENTS

| | | | |
|---|---|---|---|
| 5,307,286 A | | 4/1994 | Rusu et al. |
| 5,325,309 A | * | 6/1994 | Halaviati et al. ............. 703/15 |
| 5,394,337 A | * | 2/1995 | Shinjo ......................... 716/14 |
| 5,737,580 A | * | 4/1998 | Hathaway et al. ........... 716/12 |
| 5,764,793 A | * | 6/1998 | Omae et al. ................. 382/149 |
| 5,793,641 A | * | 8/1998 | Sayah ......................... 716/10 |
| 6,011,912 A | * | 1/2000 | Yui et al. ...................... 716/13 |
| 6,078,738 A | * | 6/2000 | Garza et al. .................. 716/21 |
| 6,081,659 A | * | 6/2000 | Garza et al. .................. 716/21 |
| 6,207,479 B1 | | 3/2001 | Liew et al. |
| 6,308,309 B1 | | 10/2001 | Gan et al. |
| 6,405,356 B1 | | 6/2002 | Yang |
| 6,477,688 B1 | | 11/2002 | Wallace |
| 6,785,877 B1 | | 8/2004 | Kozai |
| 6,799,130 B2 | * | 9/2004 | Okabe et al. ................. 702/82 |
| 6,825,931 B2 | * | 11/2004 | Welchman et al. ......... 356/394 |
| 2001/0055415 A1 | * | 12/2001 | Nozaki ....................... 382/141 |
| 2003/0031356 A1 | * | 2/2003 | Sasa ........................... 382/145 |
| 2003/0194136 A1 | * | 10/2003 | Fujii et al. .................... 382/209 |
| 2004/0143809 A1 | * | 7/2004 | Cowan et al. ................ 716/11 |
| 2004/0240724 A1 | * | 12/2004 | Fujii et al. .................... 382/145 |
| 2005/0076316 A1 | * | 4/2005 | Pierrat et al. ................... 716/4 |
| 2005/0114812 A1 | * | 5/2005 | Kok .............................. 716/7 |
| 2005/0132306 A1 | * | 6/2005 | Smith et al. ................... 716/1 |
| 2005/0132315 A1 | * | 6/2005 | Chen et al. .................... 716/9 |
| 2006/0027393 A1 | * | 2/2006 | Aonuma et al. ............ 174/250 |

* cited by examiner

*Primary Examiner*—Stacy Whitmore
(74) *Attorney, Agent, or Firm*—Amin, Turocy & Calvin, LLP

(57) ABSTRACT

The present invention is directed towards a system and/or methodology that facilitates controlling routing of blocks on a floor plan in an integrated circuit. A pattern collector receives a partially created routing pattern, and a comparing component makes a comparison between the at least partially created routing pattern with one or more patterns in a library of patterns. Routing is controlled based at least in part upon the comparison.

31 Claims, 10 Drawing Sheets

METHOD FOR MANUFACTURING PLACE & ROUTE BASED ON 2-D FORBIDDEN PATTERNS

FIELD OF INVENTION

The present invention relates generally to integrated circuit manufacturing and, in particular, to detecting and correcting routing patterns that result in unsatisfactory manufacturing and/or performance.

BACKGROUND OF THE INVENTION

Integrated circuits have permeated into every aspect of modern society. They are the building blocks used to create everything from the information super-highway to the electronic timer in the family toaster. Generally, any device that is used today that is considered "electronic" utilizes one or more integrated circuits. These often-unseen entities help to reduce the daily workload, increase the safety of our air traffic control systems, and even let us know when it is time to add softener to the washing machine. Modern society has come to rely on these devices in almost every product produced today. And, as we progress further into a technologically dependent society, the demand for increased device speeds, capacity and functionality drive integrated manufacturers to push the edge of technology even further.

In the integrated circuit industry, there is a continuing trend toward higher device densities. To achieve these high device densities there have been, and continue to be, efforts toward scaling down device dimensions (e.g., at sub-micron levels) on semiconductor wafers. In order to accomplish such densities, smaller feature sizes and more precise feature shapes are required. This may include width and spacing of interconnecting lines, spacing and diameter of contact holes, and surface geometry, such as corners and edges, of various features. The dimensions of and between such small features can be referred to as critical dimensions (CDs). Reducing CDs and reproducing more accurate CDs facilitates achieving higher device densities.

A substantial number of integrated circuits are designed for particular applications. These application specific integrated circuits comprise an integrated circuit with functionality customized for a particular use, rather than serving for general-purpose employment. For instance, an integrated circuit designed solely to effectively operate a cash register is an application specific integrated circuit, while a microprocessor is not application-specific as it can be employed for multiple purposes. Conventionally, design tools have employed descriptions of a group of semiconductor devices to assist in design of application specific integrated circuits. For example, gates such as 2-input AND gates and other gates that are known in design of integrated circuits are comprised of a plurality of transistors arranged in a particular manner. A software application provides designers with an ability to arrange a plurality of gates and/or other semiconductor devices to design an integrated circuit that functions according to a given application. Difficulties exist, however, when attempting to manufacture integrated circuits according to these custom designs.

Place and route tools are employed to facilitate manufacturing of application specific integrated circuits given a high-level design that was created in the aforementioned design software application. The place and route tools break the design into a plurality of blocks. For example, a block can be one or more gates or other circuit elements, such as power supplies and grounds. These blocks are thereafter placed upon a floor plan in matrix fashion via the place and route tool, and thereafter a router then generates connections between such blocks (e.g., lays metal tracks interconnecting the blocks, creates vias between blocks, . . . ). Another matrix of blocks can thereafter be positioned atop the previous matrix of blocks, and the router can generate connections between such matrices as well as between blocks within the matrices.

The place and route tools, however, are often ineffective in creating a circuit that can be manufactured. More particularly, place and route tools in connection with routers can create routing patterns that have poor manufacturability. For instance, the resultant routing can be associated with a poor manufacturing window as well as other manufacturing problems. Place and route tools are associated with designs with poor manufacturability because such tools employ simple algorithms when routing between blocks. Specifically, most place and route tools employ conventional "if-then" algorithms when determining a manner to interconnect blocks and layers. Accordingly, there exists a need in the art for a system and/or methodology that facilitates creation of routing patterns associated with acceptable manufacturability.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention facilitates improved control of a router when such router is employed to interconnect circuit blocks. As a router interconnects blocks, two-dimensional patterns are created by metal tracks laid down by the router as well as vias and other interconnection elements. Several of these two-dimensional patterns can be unacceptable for use with regards to manufacturing. Therefore, the present invention utilizes a library of two-dimensional patterns, wherein such two-dimensional patterns are indexed according to manufacturability, performance, ability for optical proximity correction, and any other suitable indexing indicia. In accordance with one aspect of the present invention, this library of patterns can include "forbidden" patterns that should not be employed by a router when interconnecting blocks.

In accordance with one aspect of the present invention, a pattern collector can be employed which obtains an image and/or signature of a two-dimensional routing pattern that has been created by the router when interconnecting circuit blocks. Thereafter, this obtained pattern can be compared with one or more patterns within a library of patterns. For example, the obtained pattern can be compared with one or more "forbidden" patterns. If such obtained pattern is similar to a forbidden pattern, the router can be required to re-route the pattern. Furthermore, a place and route tool can be informed to regenerate a layout of circuit blocks, therefore requiring the router to generate a disparate routing. Furthermore, the present invention can be employed to provide dynamic control to a place and route tool and/or a router. For instance, a pattern collector can obtain an image and/or signature of a pattern that is only partially completed. Thereafter, this partially completed pattern can be compared with one or more completed patterns within a library of indexed patterns. Thereafter, the router and/or place and route tool can be controlled based upon such comparison.

For example, the partially completed pattern may be non-manufacturable with addition of a via. By comparing the partially completed pattern with a non-manufacturable pattern, the present invention can be utilized to prohibit completion of the pattern in a way to make it non-manufacturable. Particularly, a comparing component can notice similarities between the partially completed pattern with a "forbidden" pattern, and such similarity can be employed when controlling the router to ensure that the partially completed pattern will not be a "forbidden" pattern when completed.

In accordance with another aspect of the present invention, a place and route tool can create a graphical rendering of a proposed routing pattern, and such pattern can be compared with one or more patterns within a library of indexed patterns. For example, the library of patterns can include one or more "forbidden" patterns (e.g., patterns that are associated with poor manufacturability). If the graphical rendering is similar to a "forbidden" pattern, the place and route tool can be required to generate a disparate routing pattern and/or disparate block layout.

A library of indexed patterns can also be automatically maintained by monitoring routing patterns upon an integrated circuit that are not existent within the library. For example, various testing procedures can be undertaken upon the routing pattern related to manufacturability, performance, etc. Thereafter an image of such pattern can be placed within the library of patterns and indexed according to the manufacturability, performance, etc.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
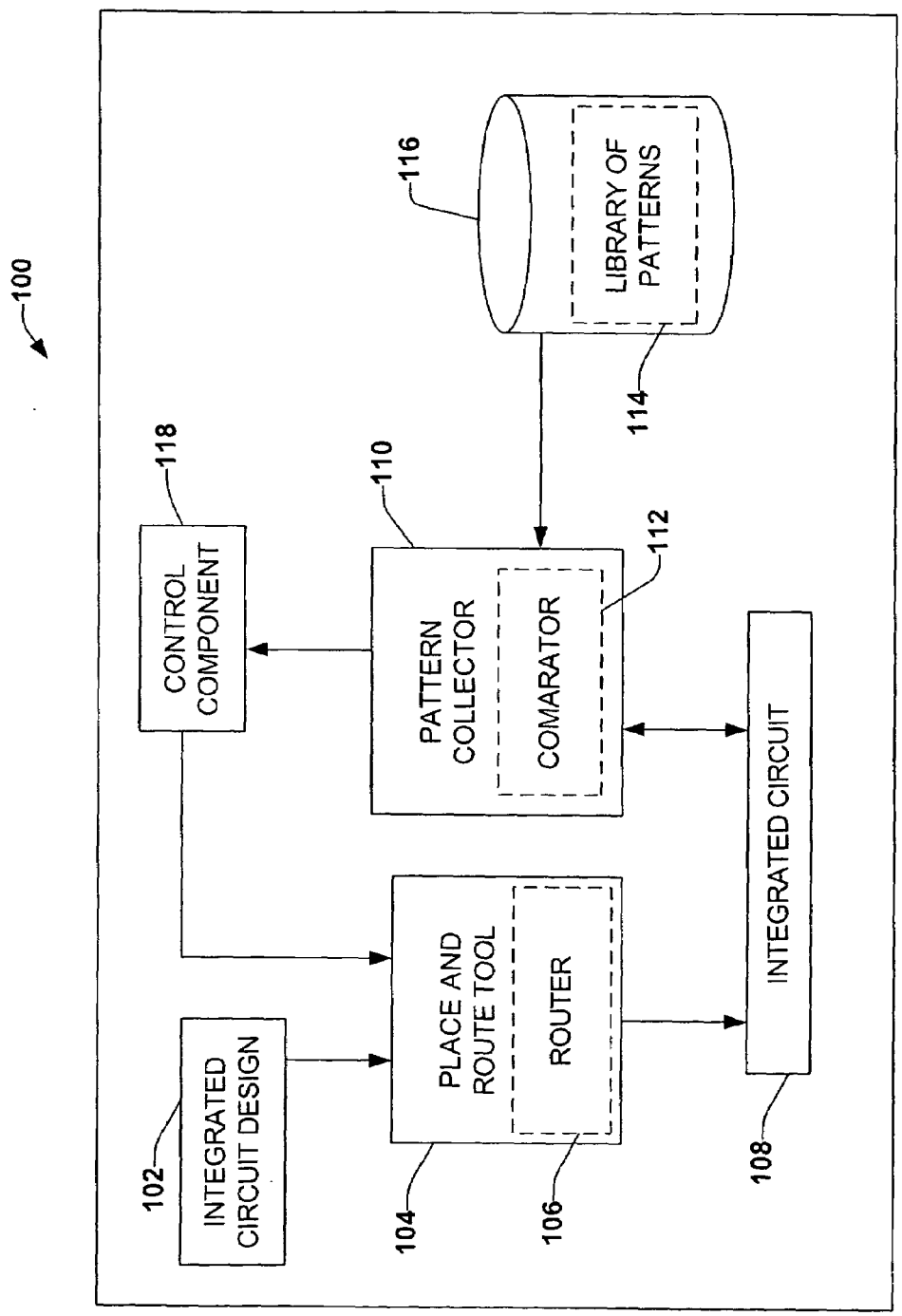
FIG. 1 is a block diagram that illustrates a system that facilitates control of a router in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring first to FIG. 1, a system 100 that facilitates improved manufacturing of integrated circuits is illustrated. The system 100 includes an integrated circuit design 102 that is desirably manufactured using a place and route tool 104. The place and route tool 104 is associated with a router 106, which is employed to lay down blocks and interconnect such blocks to create an integrated circuit 108. The router 106 is a semi-automated tool that is employed to interconnect the blocks. Particularly, the integrated circuit design 102 can consist of a plurality of interconnected gates and/or other various circuit elements. The place and route tool 104 can be employed to generate blocks based upon the integrated circuit design 102, wherein the blocks consist of one or more gates and/or other circuit elements. The place and route tool 104 thereafter places these blocks onto a floor plan, and the router 106 is utilized to electrically couple the blocks and/or elements within the blocks. For example, the router 106 can lay out metal tracks from one block to another in order to manufacture the integrated circuit 108.

A pattern collector 110 is provided to monitor interconnection patterns between blocks resident upon the integrated circuit 108. For example, the pattern collector 110 can utilize scanning electrode microscopy technology to capture an image of interconnect patterns on the integrated circuits 108. Similarly, scatterometry techniques can be employed to monitor interconnection patterns on the integrated circuit 108. For example, light can be delivered onto at least a portion of the integrated circuit 108 and reflected therefrom. The reflected light can be collected, and based at least in part upon the collected light a signature that is indicative of various interconnection patterns on the integrated circuit 108 can be generated. It is to be understood that any suitable system and/or methodology for obtaining an image of interconnection patterns resident upon the integrated circuit 108 is contemplated and intended to fall within the scope of the hereto-appended claims.

The pattern collector 110 is associated with a comparator 112 that is employed to compare one or more patterns collected by the pattern collector 110 with one or more patterns within a library of patterns 114. This library of patterns 114 can be stored in a data store 116, which can be RAM, ROM, flash memory, hard drive, or any other suitable data storage device. In accordance with one aspect of the present invention, the patterns within the library of patterns 114 can be interconnection patterns that are associated with poor manufacturability, poor optical proximity correction aptitude, a poor processing window, etc. The comparator 112 can thus compare one or more patterns collected by the pattern collector 110 with one or more patterns within the library of patterns 114. The comparator 112 can thereafter relay results of the comparison to a control component 118, which can accordingly relay control commands to the place and route tool 104. For example, if the collected pattern(s) are similar to one or more patterns within the library of patterns 114, the comparator 112 can recognize such similarity and inform the control component 118 that the routing design is unacceptable. The control component 118 can then inform the place and route tool 104 that new interconnection pattern(s) are required for subsequent integrated circuits.

In accordance with another aspect of the present invention, the comparator 112 and the control component 118 can operate in conjunction to ensure that unacceptable interconnection patterns are not completed on the integrated circuit 108. For instance, a partial interconnection pattern can be placed on the integrated circuit 108 by the router 106. The pattern collector 110 can collect an image of the partially completed pattern, and the comparator 112 can compare such partially completed patterns with one or more completed patterns within the library of patterns 114. The comparator 112 can then relay a level of similarity between the collected partially completed pattern and one or more patterns within the library of patterns 114 to the control component 118. The control component 118 can control operation of the router 106 based at least in part upon the level of similarity between the partially completed pattern and one or more patterns within the library of patterns 114. For example, if a particular routing would complete the partially completed pattern and cause such pattern to be similar to a pattern within the library of patterns 114, the control component 118 can prevent the router 106 from completed the pattern in such a manner. The router 106 will then be forced to complete routing in a manner that would not cause the partially completed pattern to be similar to a pattern within the library of patterns 114.

In accordance with another aspect of the present invention, the library of patterns 114 can include a plurality of patterns that are indexed according to various criteria. For instance, the library of patterns 114 can include images of interconnection patterns that are associated with poor manufacturability, poor processing window(s), poor performance, poor optical proximity correction capabilities, etc. Furthermore, the library of patterns 114 can include images of interconnection patterns that are associated with acceptable manufacturability, acceptable processing window(s), acceptable performance, etc. These patterns can be indexed within the library of patterns 114 according to the previously listed factors as well as other suitable performance/manufacturing factors. Thus, for example, the pattern collector 110 can obtain an image/signature indicating a partially completed interconnection pattern upon the integrated circuit 108. The comparator 112 can compare the partially completed pattern with one or more pattern(s) within the library of patterns 114, and relay a level of similarity between compared patterns to the control component 118. The control component 118 thereafter operates the router 106 according to an indexation of pattern(s) compared to the partially completed pattern as well as a level of similarity between such patterns. Therefore, during instances that the partially completed pattern is similar to a pattern within the library of patterns 114 that is indexed as unacceptable, the control component 118 can prevent the router 106 from completing the pattern on the integrated circuit 108 in an unacceptable manner. Similarly, during instances that the partially completed pattern is similar to a pattern within the library of patterns 114 that is indexed as acceptable, the control component 118 can direct the router 106 to complete the pattern on the integrated circuit 108 to complete such pattern in a manner similar to the acceptable pattern. This aspect of the present invention allows the control component 118 to direct the router 106 to route connections similar to patterns that were previously found to be acceptable.

In accordance with another aspect of the present invention, the comparator 112 can be employed to compare interconnections proposed by the place and route tool 104 prior to routing. For example, the place and route tool 104 can generate an image of a proposed routing pattern based upon the integrated circuit design 102. The comparator 112 can thereafter compare the proposed routing pattern to one or more patterns within the library of patterns 114. If the proposed routing pattern is found by the comparator 112 to be similar to a pattern within the library of patterns 114 that is unacceptable, the control component 118 can inform the place and route tool 104 to propose a disparate routing pattern. Conventional place and route tools are proprietary—therefore modifying the place and route tool 104 to enable such tool 104 to provide a proposed pattern to the comparator 112 may require permission from owners of the place and route tools. Such an implementation, however, is contemplated and intended to fall under the scope of the hereto-appended claims.

Figure 2:
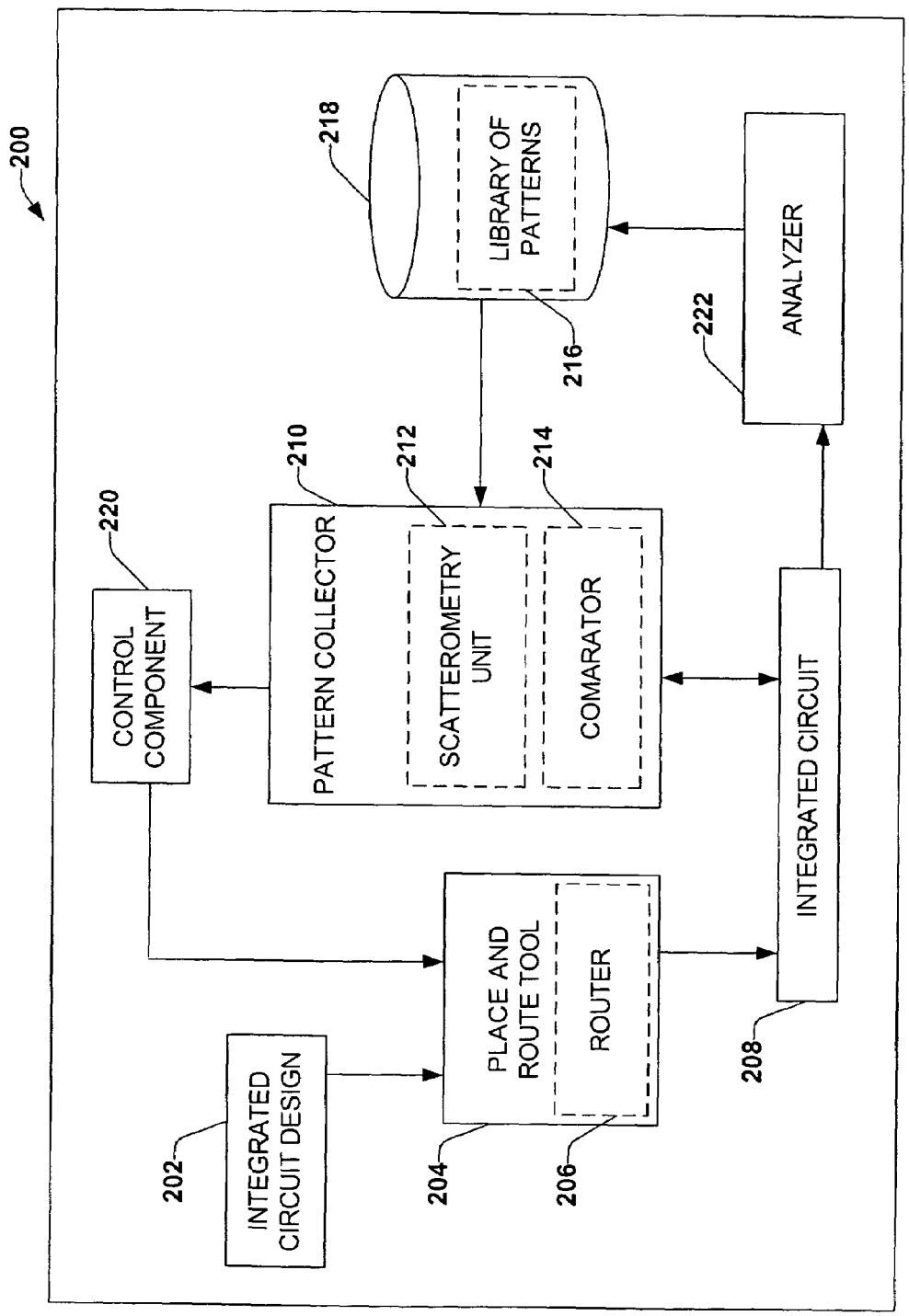
FIG. 2 is a block diagram that illustrates a system that facilitates control of a router in accordance with an aspect of the present invention.

Now referring to FIG. 2, a system 200 that facilitates interconnecting blocks within a custom integrated circuit in an acceptable manner is illustrated. The system 200 includes an integrated circuit design 202 that is relayed to a place and route tool 204. The integrated circuit design 202 can be a graphical representation of a plurality of gates (e.g., AND, OR, NOR, . . . ), electrical circuit devices (e.g., power supplies, . . . ), grounds, etc. For example, the integrated circuit design 202 can be generated in a design tool by a circuit designer, and can be customized for a particular use. The place and route tool 204 typically generates blocks that represent the gates, electrical devices, grounds, etc. based upon the received integrated circuit design 202. The place and route tool 204 also arranges a manner in which the blocks are to be laid down upon a floor. For example, given a plurality of gates, the place and route tool 204 lays blocks that make up such gates upon a floor. Thereafter a router 206 that is associated with the place and route tool 204 connects the blocks by laying out metal tracks between blocks. Conventional routers are semi-automated, and are often considered part of the place and route tool 206. For instance, conventional place and route tools are proprietary and are packed together with routers. It is to be understood, however, that the present invention is not limited to such routers and place and route tools, as they can be separately sold and/or implemented.

As the router 206 lays tracks between blocks, at least a portion of an integrated circuit 208 is manufactured, wherein such integrated circuit 208 should operate according to the integrated circuit design 202. A pattern collector 210 captures patterns created on the integrated circuit 208 by the router 206 (e.g., captures patterns of metal tracks utilized to connect blocks as described above). The pattern collector 210 captures patterns via a scatterometry unit 212. For example, the scatterometry unit can include a light emitter (not shown) that directs light onto at least a portion of the integrated circuit 208, and a light collector (not shown) can collect light reflected/refracted from the integrated circuit 208. This reflected/refracted light will create a signature indicative of a routing pattern resident upon the integrated circuit 208. Scatterometry techniques are known in the art, and any suitable scatterometry technique that can be employed to capture a pattern on the integrated circuit 208 is contemplated by the present invention and intended to fall under the hereto-appended claims.

The pattern collector 210 is also associated with a comparator 214 that compares patterns collected by the pattern collector 210 via the scatterometry unit 212 with a library of patterns 216 within a data store 218. For example, the library of patterns 216 can include patterns that are associated with poor manufacturability, poor optical proximity correction, unacceptable operability, etc. When the router 206 creates a routing pattern that is similar to a pattern within the library of patterns 216 that is unacceptable, the comparator 214 will inform a control component 220 of the match. Thereafter the control component 220 will inform the place and route tool 204 that the integrated circuit design 202 needs a disparate floor plan and/or the current floor plan requires different routing. This can save time and resources, as numerous integrated circuits 208 with unacceptable routing patterns will not be created. In accordance with another aspect of the present invention, the pattern collector 210 can collect partially completed routing patterns on the integrated circuit 208 and compare such patterns with completed patterns resident within the library of patterns 216. For example, the pattern collector 210 can obtain a partially completed pattern upon the integrated circuit 208 via the scatterometry unit 212. Thereafter the comparator 214 can compare the partially completed pattern with patterns within the library of patterns 216 that are unacceptable (e.g., poor manufacturability, poor operability, . . . ). The comparator 214 can retrieve any patterns that are and/or can be similar to the collected pattern on the integrated circuit 208 given particular routing. Thus, the system 200 can act dynamically in preventing creation of patterns on the integrated circuit 208 that would be unacceptable.

In accordance with another aspect of the present invention, the place and route tool 204 can simulate a proposed routing prior to laying metal tracks on the integrated circuit 208. For instance, the place and route tool 204 can generate a graphical rendering of a proposed routing. The comparator 214 can compare the proposed routing with patterns within the library of patterns 216 that are unacceptable and/or undesirable, and inform the control component 220 of occurrences of such undesirable patterns within the proposed routing. The control component 220 can thereafter require a disparate routing to be generated and/or a different block layout to be proposed. In accordance with one aspect of the present invention, the patterns within the library of patterns 216 can be indexed according to acceptability/desirability. For instance, patterns with poor manufacturability can be indexed and grouped together within the library of patterns 216. Furthermore, patterns that have optimal operability can be indexed together within the library of patterns 216. Such indexing facilitates creation of optimal routing patterns upon the integrated circuit 208. For example, the router 206 can begin to route blocks upon the integrated circuit 208 and create partially completed routing patterns. The pattern collector 210 can capture these patterns via the scatterometry unit 212, and the comparator 214 can compare the captured pattern(s) with indexed patterns within the library of patterns 216. If the partially completed pattern on the integrated circuit 208 is similar to one of the patterns within the library of patterns 216, the control component 220 will be informed and will control the router 206 accordingly. For instance, if the partially completed pattern is similar to a pattern indexed as "poorly manufacturable", the comparator 214 will inform the control component 220 of the comparison, and the control component 220 will prevent the router 206 from generating the "poorly manufacturable" pattern. Similarly, if the partially completed pattern is similar to a pattern indexed as "optimal", the comparator 214 will inform the control component 220 of the comparison, and the control component 220 will direct the router to complete the pattern as the "optimal" pattern. It is to be understood that these particular indexations are merely exemplary, and any suitable number/arrangement of indexations is contemplated by the present invention.

The system 200 also includes an analyzer 222 that analyzes routing patterns completed upon the integrated circuit 208. For example, if particular routing patterns created are unacceptable (e.g., poorly manufacturable, poor operability, . . . ), the analyzer 222 will detect such unacceptability and place/index the unacceptable pattern within the library of patterns 216. Thus, the library of patterns 216 will be automatically updated upon analysis of an unacceptable pattern not resident within the library of patterns 216. Furthermore, the analyzer 222 can facilitate updating/indexing of the library when acceptable patterns created by the router 206 are not resident within the library of patterns 216. This ensures that the library of patterns 216 will be dynamically updated upon locating/analyzing routing patterns resident upon the integrated circuit 208 that were not previously within the library of patterns 216. For example, the analyzer 222 can include test equipment that tests particular portions of the integrated circuit, and patterns are added/indexed to the library of patterns 216 based at least in part upon results of these tests.

Figure 3:
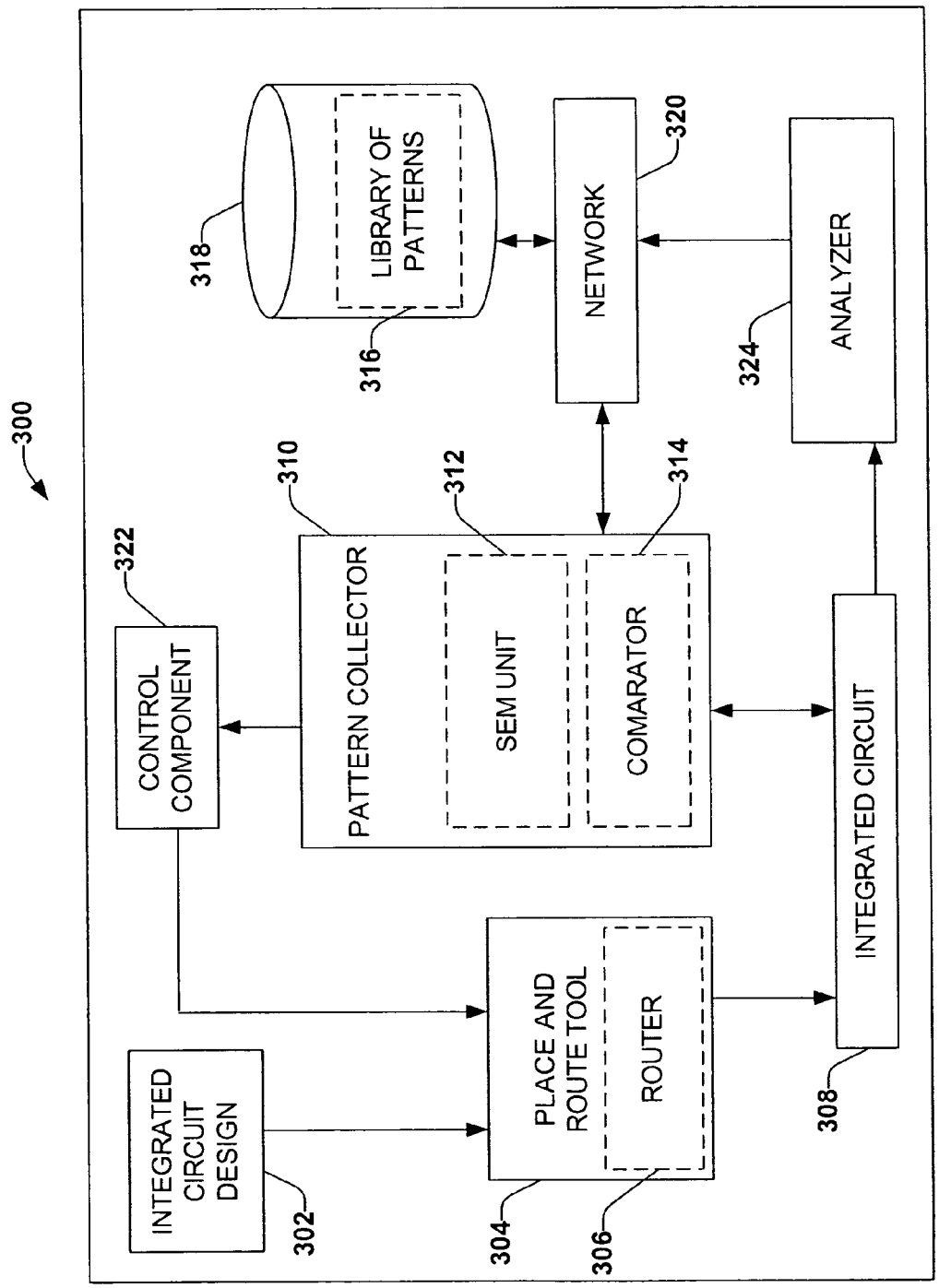
FIG. 3 is a block diagram that illustrates a system that facilitates control of a router in accordance with an aspect of the present invention.

Turning now to FIG. 3, a system 300 for controlling routing of blocks within an integrated circuit is illustrated. The system 300 includes an integrated circuit design 302 that is received by a place and route tool 304. The place and route tool 304 generates blocks of electrical components (e.g., gates, grounds, power supplies, . . . ) and lays such blocks upon a floor plan. Thereafter a router 306 associated with the place and route tool 304 lays metal tracks between the blocks to electrically interconnect such blocks. Upon routing the blocks together, a manufactured integrated circuit 308 is created that desirably operates according to the integrated circuit design 302. Conventional routers, however, utilize simplistic algorithms when interconnecting the blocks, thereby creating an integrated circuit that is poorly manufacturable, is associated with poor operability, or various other problems.

Accordingly, the system 300 includes a pattern collector 310 that monitors routing patterns as they are being laid upon the integrated circuit and/or after they are laid upon the integrated circuit 308. The pattern collector utilizes a scanning electron microscopy (SEM) unit 312 to obtain images of routing patterns resident upon the integrated circuit 308. SEM is known in the art, and utilizes electrons rather than light to form an image. Advantages of utilizing SEM over a light microscope include a larger depth field and higher resolution images. However, while a SEM unit is illustrated, it is to be understood that any suitable optical microscopy technique can be employed to obtain an image of a routing pattern. Upon obtaining one or more completed and/or partially completed routing patterns, a comparator 314 compares the obtained patterns with one or more patterns in a library of patterns 316 that is resident within a data store 318. In accordance with one aspect of the present invention, the comparator 314 can obtain one or more patterns within the library of patterns 316 via a network 320. For instance, the data store 318 can be accessible to a plurality of comparators over the network 320, thereby enabling multiple place and route tools and/or routers to be controlled while utilizing a single centralized library of patterns 316. Furthermore, the library of patterns 316 can be distributed in a plurality of disparate locations (e.g., the data store 318 can be a distributed data store).

Upon comparing the obtained pattern with pattern(s) in the library of patterns 316, the comparator 314 can relay results of the comparison to a control component 322 and the control component 322 will control the place and route tool 304 and/or the router 306 accordingly. For example, if the obtained pattern is similar to a pattern within the library of patterns 316 indexed as "forbidden", the comparator 314 will determine such similarity and inform the control component 322 of the similarity. Thereafter, the control component 322 can inform the place and route tool 304 and/or the router 306 that such routing pattern is not acceptable, and to search for a disparate routing pattern. Furthermore, the present invention can operate dynamically, wherein partially completed patterns are compared with completed patterns within the library of patterns. Thus, the control component 322 can ensure that "forbidden" routing patterns are not placed on the integrated circuit 308. Moreover, if the library of patterns 316 includes patterns indexed as "acceptable", "optimal", or the like, the control component 322 can direct the place and route tool 304 and/or the router 306 to lay routing patterns that correspond with such "acceptable" patterns.

The system 300 can also include an analyzer 324 that analyzes completed routing patterns upon the integrated circuit 308 for manufacturability, operability, ability to perform desirable optical proximity correction, etc. The analyzer 324 can operate in connection with the pattern collector 310 to update and/or maintain the library of patterns 316. For example, the pattern collector 310 can obtain a completed pattern that is not similar to a pattern within the library of patterns 316 (e.g., the comparator 314 can determine lack of similarity between stored patterns and the obtained pattern). Thereafter, the analyzer 324 can utilize various testing techniques to analyze the completed routing pattern on the integrated circuit 308. For instance, it can be determine by the analyzer 324 that the completed pattern operates poorly. Thereafter the analyzer 324 can facilitate adding the pattern into the library of patterns 316 via the network 320. Again, the network 320 will enable a plurality of analyzers to consistently update and index the library of patterns 316 when new patterns are generated. For instance, the analyzer 324 can inform the pattern collector 310 to relay an obtained pattern to the library of patterns 316, and can further inform the library of patterns 316 a manner in which to index the obtained pattern.

Figure 4:
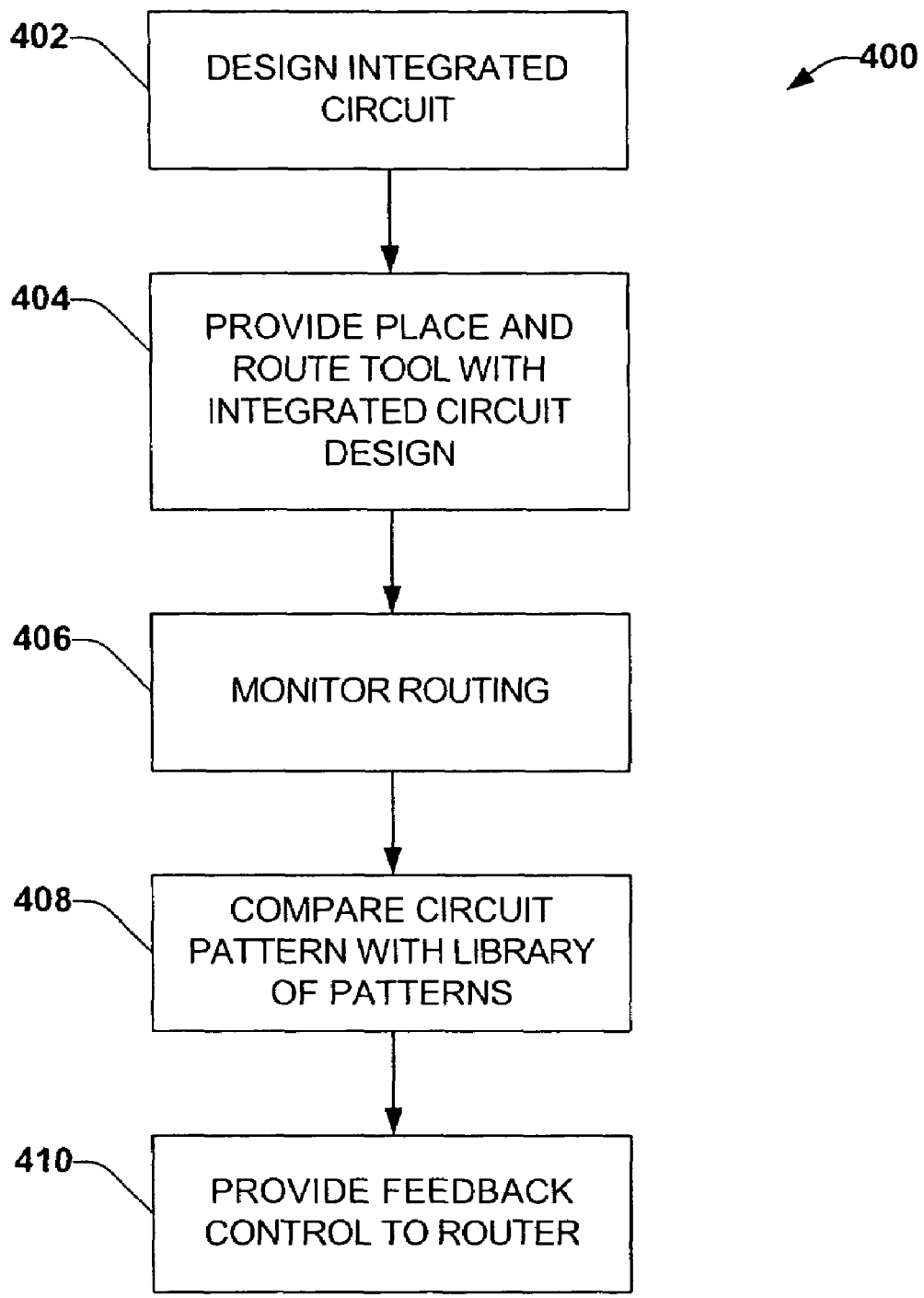
FIG. 4 is a flow diagram that illustrates a methodology for controlling a router in accordance with an aspect of the present invention.

Referring now to FIG. 4, a methodology 400 for controlling routing of interconnections between blocks in an integrated circuit is illustrated. While, for purposes of simplicity of explanation, the methodology 400 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 402, an integrated circuit is designed. Typically, a graphical representation of an integrated circuit with desirable functionality is designed within a software design tool. The integrated circuit can include any suitable gates, as well as other electronic components (e.g., power supplies, grounds, . . . ). At 404, a place and route tool is provided with the integrated circuit design. The place and route tool breaks the designed integrated circuit into a plurality of blocks, and thereafter places such blocks on a floor plan. For example, the blocks can comprise of one or more gates, power supplies, and/or any other suitable grouping of electronic components. Once the blocks are positioned upon a floor plan, a router is employed to interconnect the blocks with metal tracks, which is hereafter referred to as routing.

At 406, the routing is monitored by obtaining images and/or signatures of patterns that are being created by the router. For example, a light source can be employed to direct light upon a partially completed pattern and/or completed pattern, and a light collector can be utilized to collect light that is reflected/refracted from the pattern. From this reflected/refracted light a signature indicative of a partially completed pattern and/or completed pattern can be obtained. Furthermore, SEM techniques can be employed to obtain an image of a partially completed routing pattern and/or completed routing pattern. These signatures/images can be digitized to facilitate analysis thereof in a computer. While scatterometry and SEM techniques have been described as systems and/or methodologies for obtaining an image and/or signature of a routing pattern, it is understood that any image capturing device/method is contemplated by the present invention. For example, any microscopy technique that can obtain an image of a pattern is contemplated by the present invention.

At 408, the obtained image/signature of the pattern on the integrated circuit is compared with one or more patterns within a library of patterns. For example, the library of patterns can include several digitized images/signatures of routing patterns that are indexed as "forbidden" due to poor manufacturability, operability, etc. The obtained image/signature of the routing pattern can be compared with these "forbidden" patterns, and results of such comparison are employed as feedback control to a router at 410. For instance, if the obtained image/signature of a completed pattern is found to be similar to a "forbidden" pattern, then such information can be utilized to require the place and route tool to employ a disparate floor plan and/or require the router to utilize a disparate routing. Furthermore, the comparison can be utilized in connection with dynamically controlling the router. For example, an image/signature of a partially completed pattern can be obtained, and compared with images/signatures of completed patterns within a library of patterns. Such patterns can be indexed according to their desirability (e.g., most desirable, desirable, less desirable undesirable . . . ). If the obtained pattern is and/or can be similar to a completed pattern within the library of patterns, then the router will be controlled according to the indexation of the pattern(s) similar to the partially completed pattern. For example, if the partially completed pattern is similar to a pattern indexed as "forbidden", then the router could be controlled to prevent completion of the routing pattern in such a way that would be substantially match the "forbidden" pattern. Conversely, if the partially completed pattern is similar to a pattern indexed as "desirable", then the router could be controlled to complete the routing pattern in such a way to substantially match the "desirable" pattern. Thus, the router can be controlled based at least in part upon indexation of pattern(s) that are similar to the obtained pattern.

Figure 5:
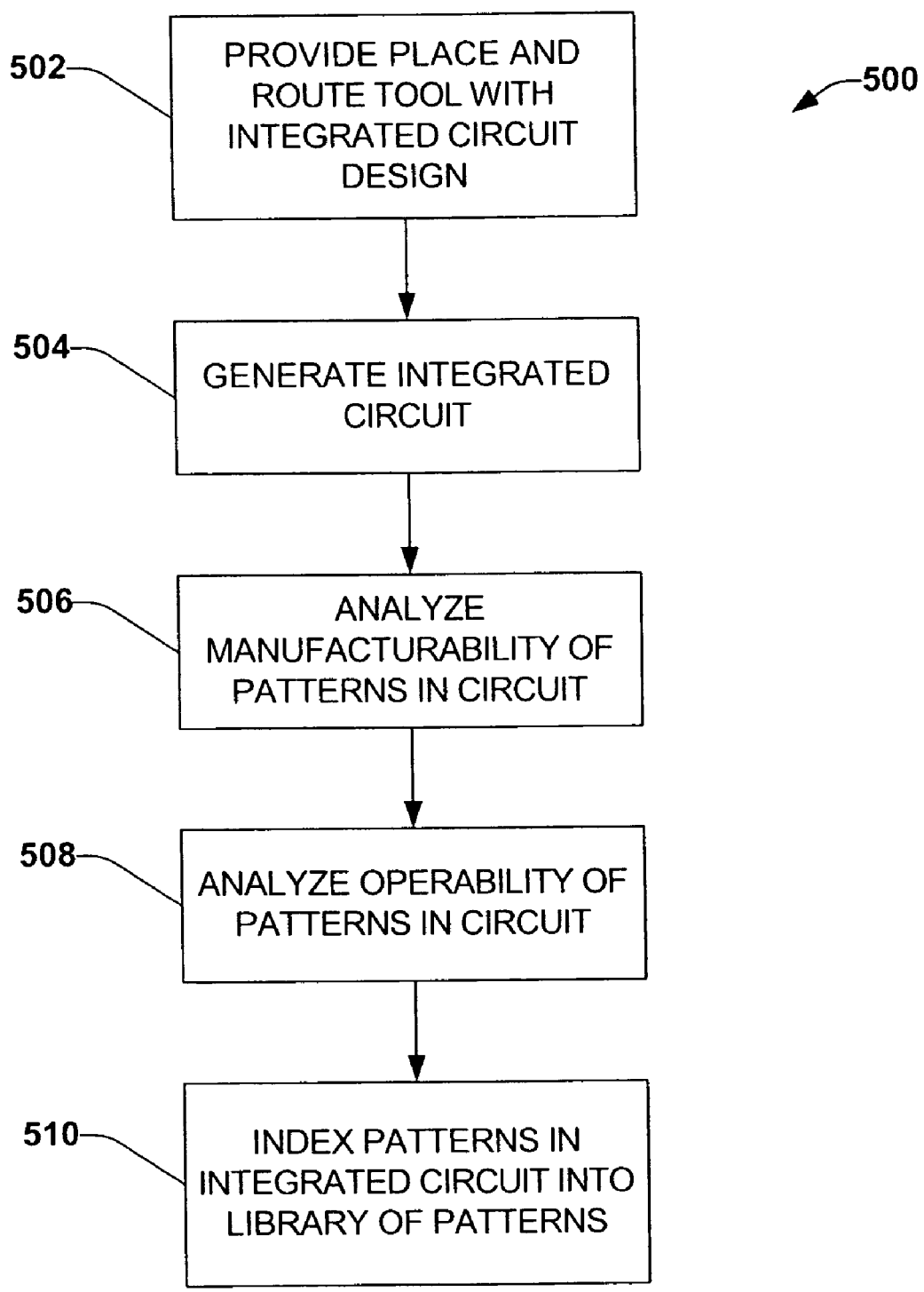
FIG. 5 is a flow diagram that illustrates a methodology for maintaining a library of patterns in accordance with an aspect of the present invention.

Now referring to FIG. 5, a methodology for automatically updating and/or maintaining a library of patterns that is utilized in connection with the present invention is illustrated. At 502, a place and route tool is provided. Conventional place and route tools are typically provided with a design for a customized integrated circuit design, and thereafter such design is broken into a plurality of blocks and laid upon a floor plan. For example, the blocks can comprise one or more gates, power supplies, power supplies, or any other suitable circuit element or combination thereof.

At 504, the integrated circuit is created based upon the customized integrated circuit design. For instance, blocks are laid down upon the floor plan, and the blocks are interconnected by metal tracks laid down by a router. These metal tracks can include vias and other suitable interconnecting elements. This combination of metal tracks, vias and other interconnecting elements creates patterns upon the floor plan of the integrated circuit. At 506 the manufacturability of these patterns generated by the router is analyzed. For example, a determination can be made regarding whether there is a sufficient manufacturing window for the created patterns.

At 508, operability of patterns within the integrated circuit is analyzed. For instance, certain patterns may perform better under particular conditions than other patterns. Various testing equipment can be provided with respect to acts 506 and 508 to analyze manufacturability and operability of particular patterns within the integrated circuit.

At 510, these analyzed patterns are indexed into a library of patterns. For example, if the analyzed pattern(s) are poorly manufacturable and/or operate poorly under real-world operating conditions, the patterns can be indexed as "forbidden" or the like in a library of patterns. If the analyzed pattern(s) operate acceptably, then the patterns can be indexed into the library of patterns as "acceptable" or the like. It is to be understood that the present invention contemplates any level and label of indexation of patterns within a library of patterns. In accordance with one aspect of the present invention, an image can be obtained of the patterns analyzed by SEM techniques, scatterometry techniques, or any other suitable manner of obtaining an image. Upon analyzing the pattern, the image of such pattern can be delivered to the library of patterns and indexed according to the analysis.

Figure 6:
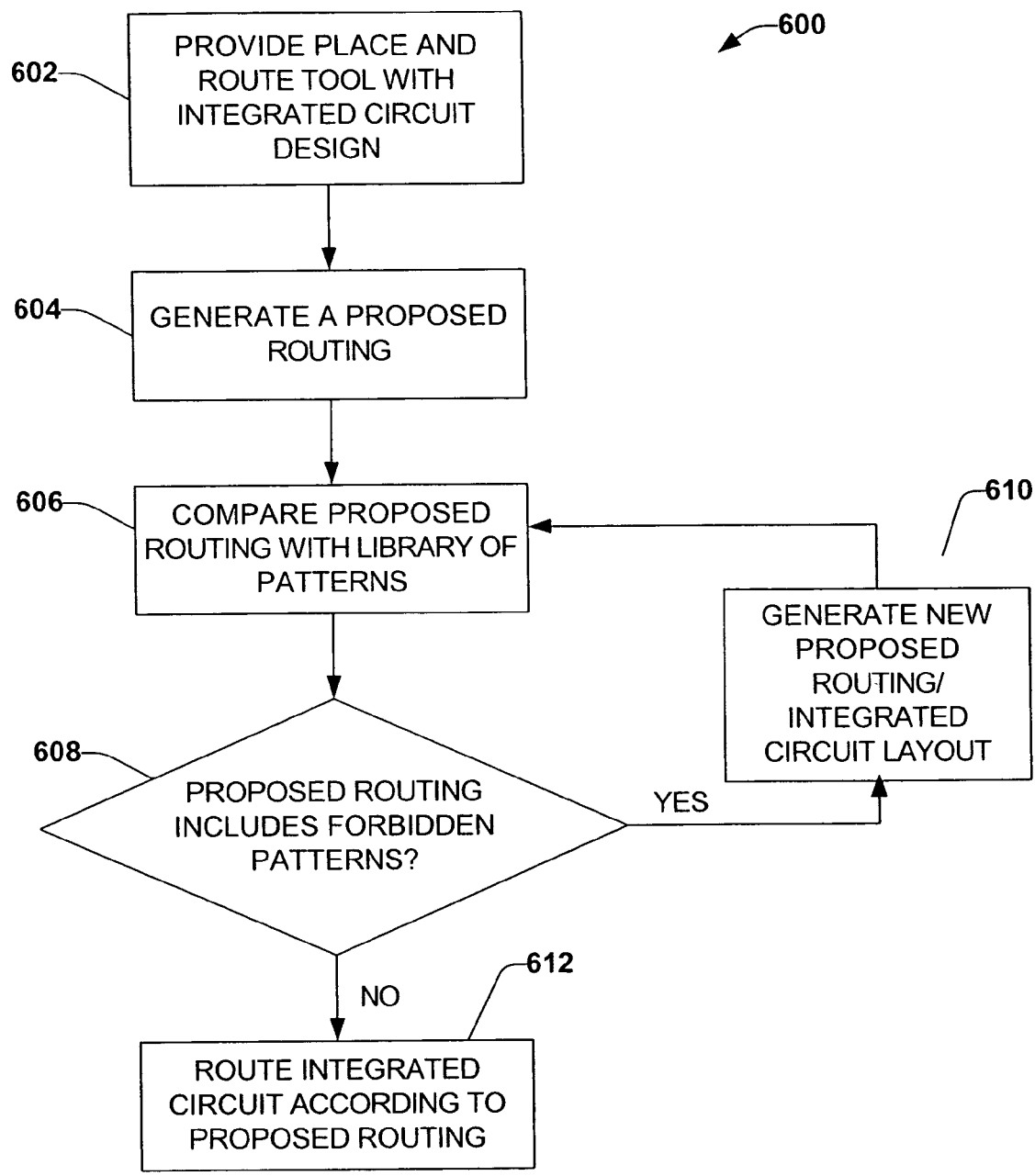
FIG. 6 is a flow diagram that illustrates a methodology for controlling a router in accordance with an aspect of the present invention.

Turning now to FIG. 6, a methodology 600 for preventing creation of poorly manufacturable and/or poorly operable interconnection patterns between blocks of a custom integrated circuit is illustrated. At 602, an integrated circuit design is provided to a place and route tool. In accordance with one aspect of the present invention, the integrated circuit design is a customized design operable to complete particular tasks. At 604, the place and route tool lays down blocks upon a floor plan and generates a proposed routing between such blocks. For instance, the place and route tool can propose a layout of metal tracks between the blocks, vias, and other suitable interconnection mechanisms. This proposed routing can be in the form of a graphical rendering or any other suitable image (e.g., the proposed routing can be pulled from an image of a previously created routing).

At 606, the proposed routing is compared with a library of images and/or signatures of routing patterns. These images and/or signatures can be indexed according to desirability, and the place and route tool can be controlled based at least in part upon the indexation. For example, the library of patterns may include only routing patterns that are "forbidden" (e.g., they are associated with poor manufacturability and/or operability). Then the proposed routing patterns can be compared with the "forbidden" routing patterns that are stored within the library of patterns. At 608, if the proposed routing pattern(s) include pattern(s) that are substantially similar to those within the "forbidden" library of patterns, then at 610 the place and route tool is required to propose a disparate integrated circuit layout and/or routing pattern. If the proposed routing patterns do not include any pattern(s) that are similar to pattern(s) within the "forbidden" library of patterns, then at 612 the router can route the integrated circuit according to the proposed routing. Utilizing the methodology 600 will ensure that routing patterns that are not manufacturable and/or are poorly manufacturable will not be created upon an integrated circuit.

Figure 7:
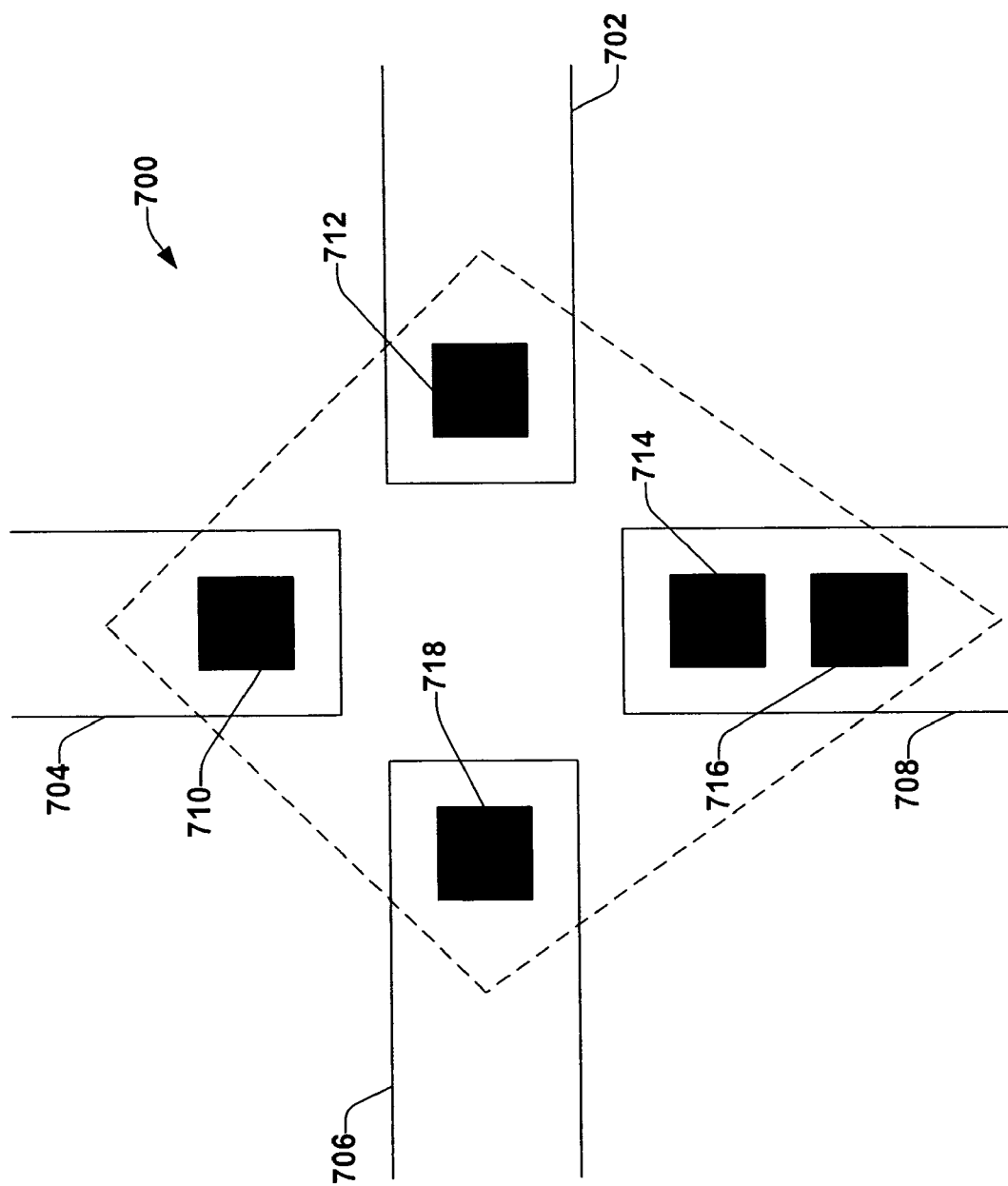
FIG. 7 is an exemplary "forbidden" pattern that can be utilized by a library of patterns in accordance with an aspect of the present invention.

Now referring to FIG. 7, an exemplary "forbidden" pattern 700 is illustrated that can be stored in a library of patterns in accordance with an aspect of the present invention. The "forbidden" pattern includes metal tracks 702, 704, 706, and 708 that are terminated prior to completion, as completion of such tracks 702-708 would require encroachment onto one another. This layout of metal tracks could be labeled non-manufacturable, and thus could be stored as a two-dimensional image in a library of "forbidden" patterns. Utilizing conventional place and route tools, it would not be determined that the pattern 700 was non-manufacturable until after the metal tracks 702-708 had already been laid upon a floor plan. Employing one or more aspects of the present invention, however, would provide for detection of the "forbidden" pattern 700 prior to completion.

Furthermore, the "forbidden" pattern 700 includes vias 710, 712, 714, 716, and 718 that are arranged in a diamond-type pattern. Vias creating this diamond pattern or other similar diamond pattern may also be poorly manufacturable. For instance, if via 716 were not placed upon track 708, then the pattern 700 may be manufacturable. Conventional place and route tools would not make this determination, as they employ simplistic if-then algorithms to determine how blocks on a floor plan should be interconnected. Utilizing the present invention, however, a place and route tool would know not to create the via 716 on the track 708, and would be forced to find a disparate, acceptable routing pattern to interconnect blocks.

Figure 8:
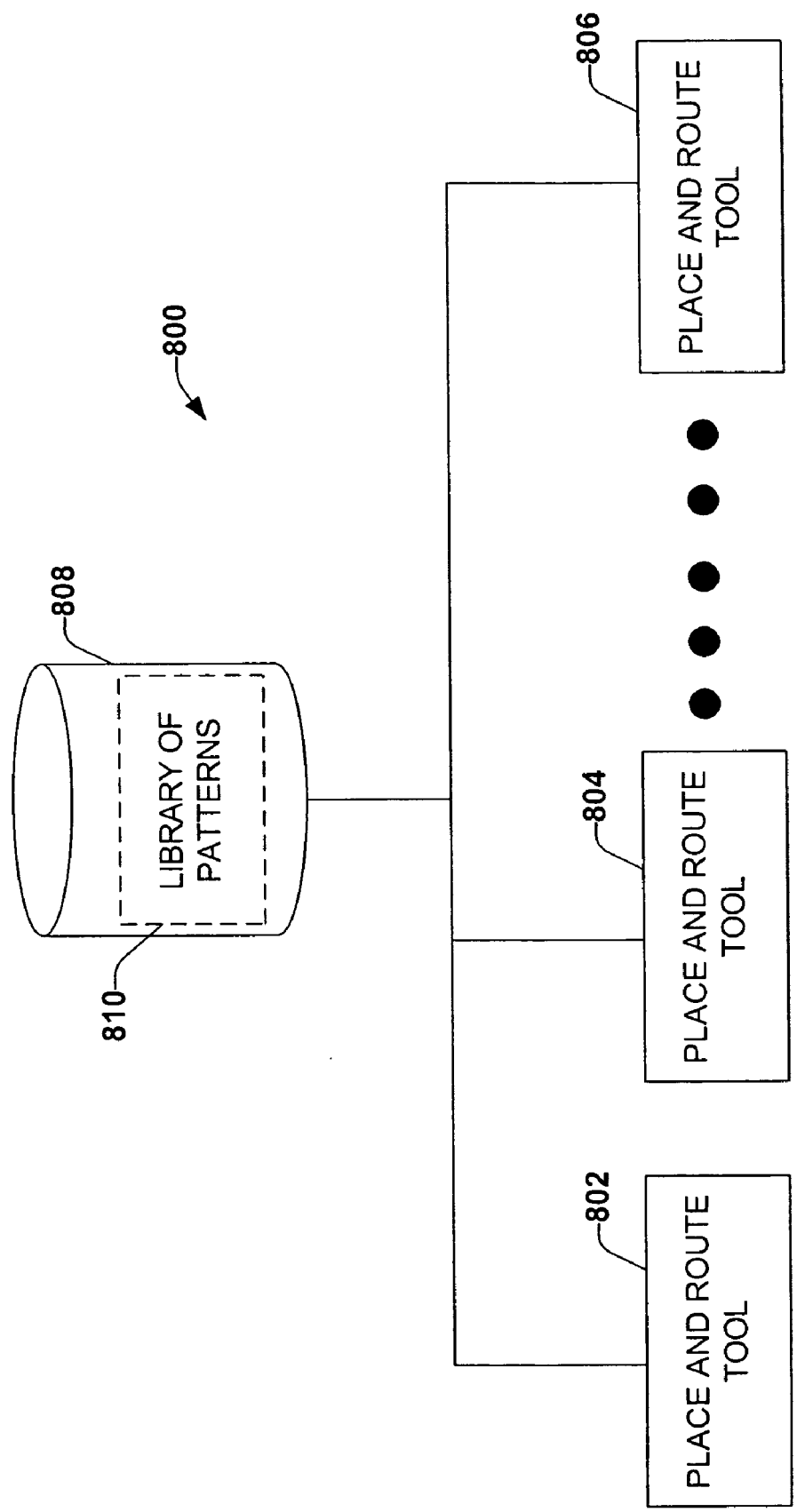
FIG. 8 illustrates a plurality of place and route tools that have access to a library of patterns in accordance with an aspect of the present invention.

Now referring to FIG. 8, an exemplary networking environment 800 that can be utilized in conjunction with the present invention is illustrated. The environment 800 includes a plurality of place and route tools 802-806, where place and route tool 806 represents an Nth place and route tool, N being an integer. The place and route tools 802-806 have access to a data store 808 containing a library of patterns 810 over a network connection 812. Providing access to a plurality of place and route tools to a central library of patterns permits more robust control of routing, as disparate libraries of patterns will not be required. Furthermore, the place and route tools 802-806 can update the library of patterns 810 by analyzing disparate two-dimensional routing patterns that appear on customized integrated circuits. For instance, the place and route tool 802 can facilitate creating a two-dimensional patter upon an integrated circuit that has not previously been observed. The place and route tool 802 (and the other place and route tools) can be associated with an analyzer (not shown) that analyzes manufacturability, operability, and other performance factors and indexes an image of the pattern in the library of patterns 810. Therefore, the place and route tool 804 will be able to utilize the image of a pattern created by the place and route tool 802 to control routing.

Figure 9:
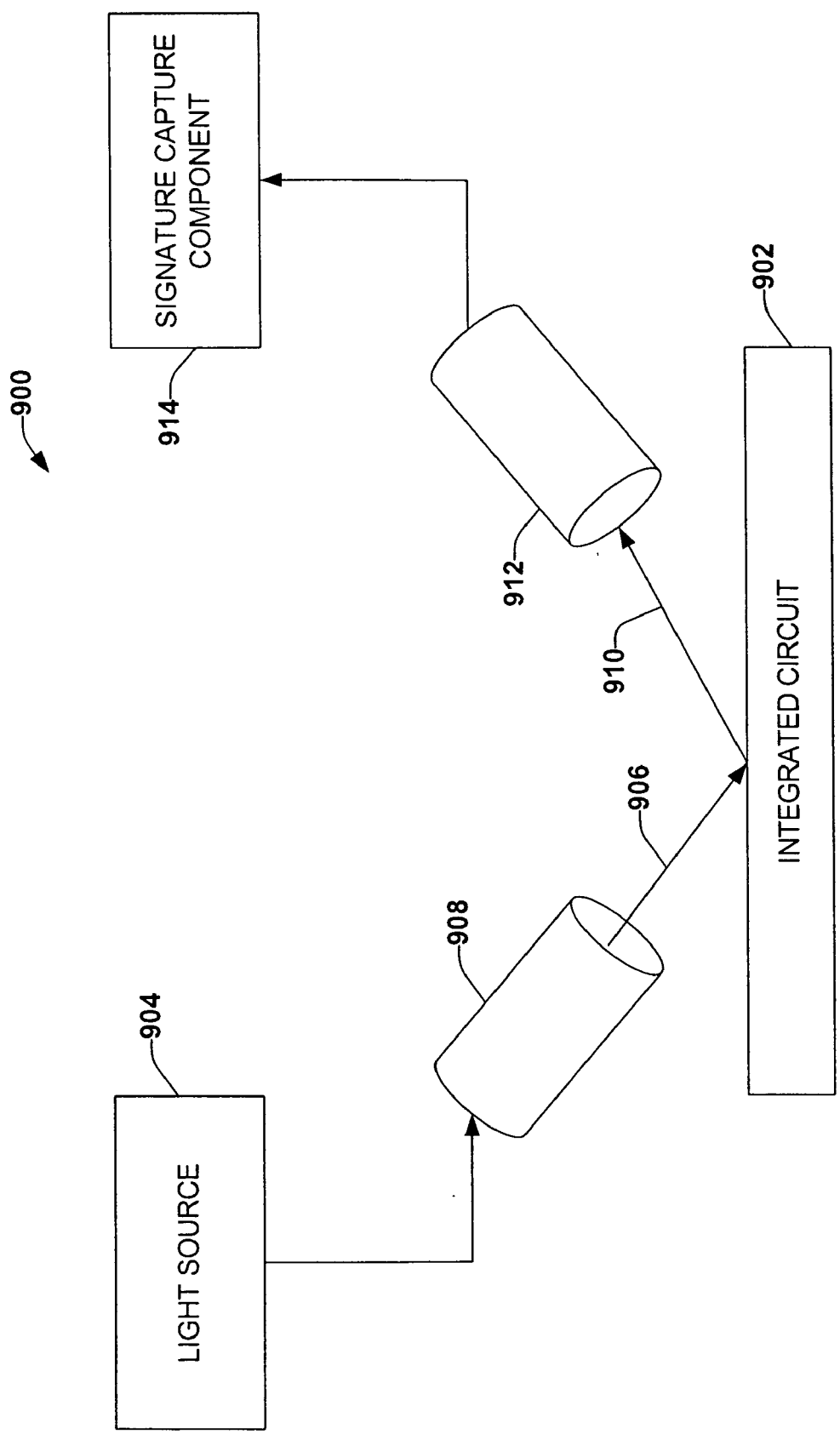
FIG. 9 illustrates an exemplary scatterometry system that can be employed in connection with the present invention.

Turning now to FIG. 9, one aspect of the present invention is shown. FIG. 9 illustrates a scatterometry system 900 being employed to generate a signature of a routing pattern resident upon an integrated circuit 902. A light source 904 directs a light 906 through a light directing component 908 incident to the surface of the integrated circuit 902. Reflected light 910 from the integrated circuit 902 is captured by a light detecting component 912, which transmits the collected light and/or data associated with the collected light to a signature capture component 914. The signature capture component 914 can, for example, employ a processor (not shown) which receives the light 908 collected by the light detecting component 910 and generates a signature of one or more routing patterns based upon such reflected light. This signature can thereafter be compared with other signatures stored within a library of signatures to control routing upon the integrated circuit 902.

Figure 10:
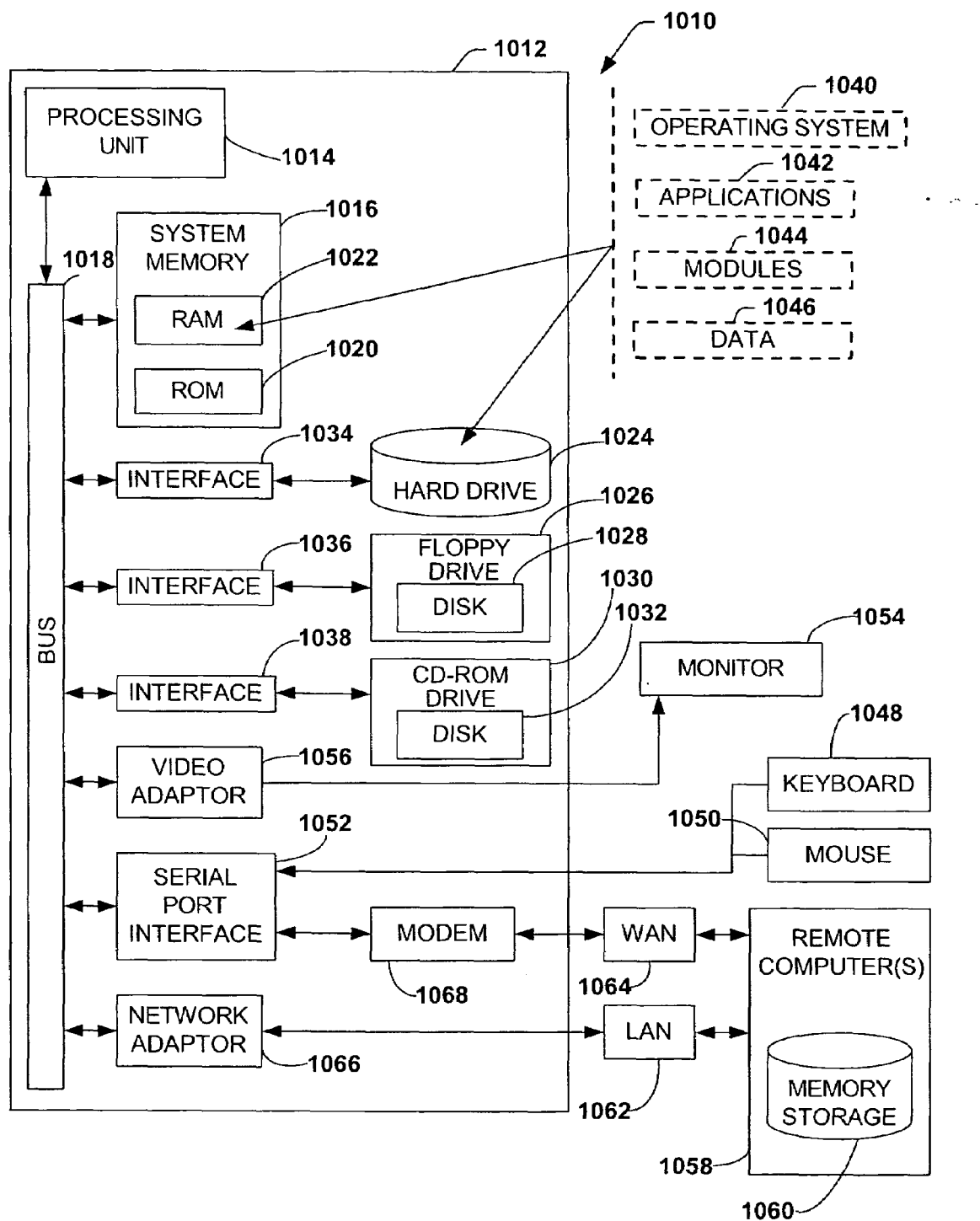
FIG. 10 is an exemplary computing environment that can be utilized in connection with the present invention.

In order to provide additional context for various aspects of the present invention, FIG. 10 and the following discussion are intended to provide a brief, general description of a suitable computing environment 1010 in which the various aspects of the present invention can be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 10, an exemplary environment 1010 for implementing various aspects of the invention includes a computer 1012, including a processing unit 1014, a system memory 1016, and a system bus 1018 that couples various system components including the system memory to the processing unit 1014. The processing unit 1014 may be any of various commercially available processors. Dual microprocessors and other multi-processor architectures also can be used as the processing unit 1014.

The system bus 1018 can be any of several types of bus structure including a memory bus or memory controller, a peripheral bus, and a local bus using any of a variety of conventional bus architectures such as PCI, VESA, Microchannel, ISA, and EISA, to name a few. The system memory 1016 includes read only memory (ROM) 1020 and random access memory (RAM) 1022. A basic input/output system (BIOS), containing the basic routines that help to transfer information between elements within the computer 1012, such as during start-up, is stored in ROM 1020.

The computer 1012 further includes a hard disk drive 1024, a magnetic disk drive 1026 to read from or write to, for example, a removable disk 1028, and an optical disk drive 1030 for reading, for example, from a CD-ROM disk 1032 or to read from or write to other optical media. The hard disk drive 1024, magnetic disk drive 1026, and optical disk drive 1030 are connected to the system bus 1018 by a hard disk drive interface 1034, a magnetic disk drive interface 1036, and an optical drive interface 1038, respectively. The drives and their associated computer-readable media provide nonvolatile storage of data, data structures, computer-executable instructions, etc. for the computer 1012, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 1022, including an operating system 1040, one or more application programs 1042, other program modules 1044, and program data 1046. The operating system 1040 in the illustrated computer is, for example, the "Microsoft® Windows® NT" operating system, although it is to be appreciated that the present invention may be implemented with other operating systems or combinations of operating systems, such as UNIX®, LINUX®, etc.

A user may enter commands and information into the computer 1012 through a keyboard 1048 and a pointing device, such as a mouse 1050. Other input devices (not shown) may include a microphone, an IR remote control, a joystick, a game pad, a satellite dish, a scanner, or the like. These and other input devices are often connected to the processing unit 1014 through a serial port interface 1052 that is coupled to the system bus 1018, but may be connected by other interfaces, such as a parallel port, a game port, a universal serial bus ("USB"), an IR interface, etc. A monitor 1054 or other type of display device is also connected to the system bus 1018 via an interface, such as a video adapter 1056. In addition to the monitor, a computer typically includes other peripheral output devices (not shown), such as speakers, printers etc.

The computer 1012 may operate in a networked environment using logical connections to one or more remote computers, such as a remote computer(s) 1058. The remote computer(s) 1058 may be a workstation, a server computer, a router, a personal computer, microprocessor based entertainment appliance (e.g., a WEBTV® client system), a peer device or other common network node, and typically includes many or all of the elements described relative to the computer 1012, although, for purposes of brevity, only a memory storage device 1060 is illustrated. The logical connections depicted include a local area network (LAN) 1062 and a wide area network (WAN) 1064. Such networking environments are commonplace in offices, enterprise-wide computer networks, intranets and the Internet.

When used in a LAN networking environment, the computer 1012 is connected to the local network 1062 through a network interface or adapter 1066. When used in a WAN networking environment, the computer 1012 typically includes a modem 1068, or is connected to a communications server on the LAN, or has other means for establishing communications over the WAN 1064, such as the Internet. The modem 1068, which may be internal or external, is connected to the system bus 1018 via the serial port interface 1052 to enable communications, for example, via POTS. The modem 1068 may also, in an alternative embodiment, be connected to the network adaptor 1066 to enable communications, for example, via DSL or cable. In a networked environment, program modules depicted relative to the computer 1012, or portions thereof, will be stored in the remote memory storage device 1060. It may be appreciated that the network connections shown are exemplary and other means of establishing a communications link between the computers may be used.

What has been described above is one or more aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" is used in either the detailed description or the claims, such term is intended to be inclusive in a manner similar to the term "comprising."

What is claimed is:

1. A system that controls routing of blocks on a floor plan in an integrated circuit, comprising:
   a pattern collector that receives a routing pattern that is at least partially completed;
   a library of forbidden patterns comprising a plurality of patterns that result in poor manufacturing; and
   a comparing component that makes a comparison between the at least partially completed routing pattern with at least one pattern in the library of forbidden patterns, subsequent routing is controlled based at least in part upon the comparison.

2. The system of claim 1, the library of patterns comprising a library of patterns that are indexed according to desirability of such patterns.

3. The system of claim 1, the library of patterns comprising one or more of an image of a routing pattern and a signature of a routing pattern.

4. The system of claim 1, the pattern collector employs scanning electron microscope techniques to obtain the at least partially completed routing pattern.

5. The system of claim 1, the pattern collector employs scatterometry techniques to obtain the at least partially completed routing pattern.

6. The system of claim 1, the at least partially completed routing pattern is a graphical rendering of a proposed routing pattern generated by a place and route tool.

7. The system of claim 6, the place and route tool generates a disparate graphical rendering based at least in part upon the comparison.

8. The system of claim 6, the place and route tool generates a disparate floor plan based at least in part upon the comparison.

9. The system of claim 1, the library of patterns is networked with a plurality of place and route tools.

10. The system of claim 1, at least one pattern in the plurality of patterns that result in poor manufacturing comprises a plurality of metal tracks that, when completely routed result in encroachment of one another.

11. The system of claim 1, further comprising an analyzer that adds a pattern obtained by the pattern collector to the library of patterns when the pattern does not exist within the library of patterns.

12. The system of claim 11, wherein the library of patterns is networked with a plurality of analyzers, and the analyzers add a pattern obtained by the pattern collector to the library of patterns when the pattern does not exist within the library of patterns.

13. The system of claim 11, the added pattern indexed within the library of patterns according to manufacturability.

14. The system of claim 11, the added pattern indexed within the library of patterns according to optical proximity correction capabilities.

15. The system of claim 1, the routing pattern is re-routed prior to completion based at least in part upon the comparison.

16. A place and route tool comprising the system of claim 1.

17. A method for interconnecting blocks within an integrated circuit, comprising:
   providing a library of images representing forbidden routing patterns;
   obtaining an image of a routing pattern upon an integrated circuit that is at least partially completed;
   comparing the obtained image with at least one image pattern within the library of a forbidden routing images of forbidden routing patterns; and
   generating feedback control to a router based at least in part upon the comparison.

18. The method of claim 17, the image of the obtained routing pattern generated via scanning electron microscopy techniques.

19. The method of claim 17, the image of the obtained routing pattern being a signature that is generated via scatterometry techniques.

20. The method of claim 17, further comprising indexing the library of images according to manufacturability of the routing patterns corresponding to the images.

21. The method of claim 17, further comprising:
   obtaining images of patterns not existent within the library of images; and
   indexing the obtained images according to at least one of manufacturability and operability.

22. The method of claim 17, further comprising altering a manner in which the router proposed to complete the at least partially completed routing pattern.

23. A system for controlling a router in a custom integrated circuit, comprising:
   means for obtaining an image of a partially completed routing pattern upon the integrated circuit;

means for comparing the obtained image with at least one image of a forbidden pattern within a library of images of forbidden patterns; and means for controlling the router throughout the completion of routing upon the partially completed routing pattern based at least in part upon the comparison.

24. The system of claim 23, the image of the previously completed routing pattern is one of a plurality of images within a library of images.

25. The system of claim 24, the library of images comprising at least one image that is poorly manufacturable.

26. The system of claim 24, further comprising means for analyzing routing patterns upon the custom integrated circuit that are not associated with an image within the library of images.

27. The system of claim 26, further comprising means for maintaining the library of images based upon the analysis.

28. The system of claim 24, further comprising means for networking the library of images to a plurality of place and route tool.

29. A system for providing feedback control to a place and route tool, comprising:

a router that lays tracks between blocks;

an image capture component that captures an image of a two-dimensional pattern resulting from the laid tracks;

a library of images of forbidden patterns that comprises at least one two-dimensional track layout forbidden pattern exhibiting poor operability; and a comparison component that retrieves the at least one image pattern within the library of a forbidden images of forbidden patterns and compares the image to the image of the captured by the capture component, the feedback control is provided forbidden pattern to the router based at least in part upon the comparison.

30. The system of claim 29, the image capture component comprises a scanning electron microscope.

31. The system of claim 29, the image capture component utilizes scatterometry techniques to capture the image.

* * * * *